(12) United States Patent
Guimberteau et al.

(10) Patent No.: US 12,342,792 B2
(45) Date of Patent: Jul. 1, 2025

(54) NOSE RING FOR RUMINANTS (71) Applicant: Ceva Sante Animale, Libourne (FR)

(72) Inventors: Florence Guimberteau, Libourne (FR);
Sandrine Lacoste, Libourne (FR);
Edouard Timsit, Libourne (FR)

(73) Assignee: CEVA SANTE ANIMALE, Libourne (FR)

( * ) Notice: Subject to any disclaimer, the term of this patent is extended or adjusted under 35 U.S.C. 154(b) by 0 days.

(21) Appl. No.: 18/553,588

(22) PCT Filed: Mar. 31, 2022

(86) PCT No.: PCT/EP2022/058546
§ 371 (c)(1),
(2) Date: Oct. 2, 2023

(87) PCT Pub. No.: WO2022/207780
PCT Pub. Date: Oct. 6, 2022

(65) Prior Publication Data
US 2024/0172725 A1    May 30, 2024

(30) Foreign Application Priority Data
Apr. 1, 2021   (EP) ..................................... 21166768

(51) Int. Cl.
*A01K 15/00*   (2006.01)
(52) U.S. Cl.
CPC .................................. *A01K 15/003* (2013.01)
(58) Field of Classification Search
CPC .......... A01K 15/003; A61D 7/04; A61D 7/00; A61D 17/002; A61D 13/00
See application file for complete search history.

(56) References Cited

U.S. PATENT DOCUMENTS

| 816,194 A | 3/1906 | Teeter |
| 3,788,296 A * | 1/1974 | Klatt ........................ A61D 7/00 604/93.01 |

(Continued)

FOREIGN PATENT DOCUMENTS

| EP | 0016431 A1 * | 10/1980 |
| EP | 3494782 A1 | 6/2019 |

(Continued)

OTHER PUBLICATIONS

International Search Report and Written Opinion in International Application No. PCT/EP2022/058546, with partial translation, 14 pages, Jul. 15, 2022.

*Primary Examiner* — Joshua D Huson
*Assistant Examiner* — Katherine Anne Kloecker
(74) *Attorney, Agent, or Firm* — HESLIN ROTHENBERG FARLEY & MESITI P.C.

(57) ABSTRACT

The present invention relates to a nose ring for ruminants such as cattle, comprising a ring body (1) having an extra-nasal part (2) and intra-nasal parts (3) extending on either side of this extra-nasal part (2), each of these intra-nasal parts (3) carrying a plate (4, 5) intended to bear against the nasal septum separating the nasal cavities of a ruminant, said bearing plates (4, 5) thus being placed at the ends of said nose ring. According to the invention, each bearing plate has an elongate shape and comprises opposite ends, at least one of which is wider than the central region thereof placed between said two ends, each plate being convex and having a front face intended to come into contact with the nasal wall of the animal, the surface area of which front face is at least equal to 500 mm² and preferably at least equal to 1500 mm², and even more preferably at least equal to 2000 mm², each bearing plate thus being capable of maximising the contact surface with the nasal septum for different nasal morpholo- (Continued)

gies in order to ensure that this ring is retained without injuring the animal.

17 Claims, 4 Drawing Sheets

(56) References Cited

U.S. PATENT DOCUMENTS

| | | | | |
|---|---|---|---|---|
| 3,889,658 A | * | 6/1975 | Newhall | A61B 10/00 |
| | | | | 374/E11.006 |
| 4,369,783 A | | 1/1983 | Hiller et al. | |
| 5,533,470 A | * | 7/1996 | Rose | A01K 15/003 |
| | | | | 119/908 |
| 2021/0076639 A1 | * | 3/2021 | Yoshime Watanabe | |
| | | | | A01K 15/003 |
| 2023/0345915 A1 | * | 11/2023 | Timsit | A01K 29/005 |

FOREIGN PATENT DOCUMENTS

| | | |
|---|---|---|
| FR | 2138882 A1 | 1/1973 |
| WO | 2019113661 A1 | 6/2019 |

\* cited by examiner

NOSE RING FOR RUMINANTS

CROSS REFERENCE TO RELATED APPLICATIONS

This application is a U.S. National Phase filing under 35 U.S.C. § 371 of International Application PCT/EP2022/058546, filed Mar. 31, 2022, and published as WO2022/207780A1 on Oct. 6, 2022. PCT/EP2022/058546 claims priority from European application number 21166768.8, filed Apr. 1, 2021. The entire contents of each of these prior applications are hereby incorporated herein by reference.

TECHNICAL FIELD

The present invention relates to a nose ring for ruminants such as cattle.

PRIOR ART

It is known to attach a device having the shape of a ring or a loop in or on the nasal septum of a bovine for the application of substances, in particular veterinary products, or for remotely monitoring the animal.

Advantageously, a nose ring is put in place by simply pinching the nasal septum of the bovine by means of the terminal portions of the ring.

These terminal portions are typically ball-shaped bulges or disc-shaped heads.

However, it must be noted that these terminal portions have not generally been designed to take into account the morphology of the bovine nose, more particularly of the conical appearance of the nostril inlets.

The appearance of injuries caused in the nasal mucosa by the terminal portions of the ring is then observed, these mucous membranes being fragile and highly vascularized and the stresses applied by these terminal portions being high (especially in the cranial part, due to the conical appearance of the nose).

Moreover, such a ring which is placed at the center of the muzzle or on the upper lip of the animal, prevents satisfactory cleaning of the muzzle.

However, it is known that this hairless area of the animal which is essential, requires regular maintenance to guarantee good hygiene.

On the other hand, this nose ring is also able to come into contact with the feed of the animal, thus constituting a potential source of contamination.

It is also difficult for the animal to use its muzzle to actuate a push-paddle waterer and suitably drink when a nose ring is placed at the center of its muzzle or on its upper lip.

Furthermore, it is known that the body of a nose ring can have a cross-section of elliptical, circular or even rectangular shape.

It can be seen that such rings are generally large.

However, the muzzle and its nostrils constitute essential elements of the sensory and tactile perception of cattle and consequently are commonly used in particular to explore or act on the external environment.

These rings are then likely to snag on an external element and be pulled suddenly from the animal's nostrils.

Again, in such cases, injuries can be observed, which allow numerous pathogens to enter.

There is therefore a pressing requirement for a nose ring for ruminants, the original design of which makes it possible to overcome the disadvantages of the prior art described above.

SUBJECT MATTER OF THE INVENTION

The present invention aims to overcome the disadvantages of the prior art by proposing a nose ring, simple in its design and in its operating mode, ensuring firm holding thereof while substantially reducing the risk of injury to the animal.

Another object of the present invention is such a nose ring whose risk of undesirable tearing is limited.

Yet another subject matter of the present invention is such a ring allowing a ruminant to feed and drink without difficulty.

Yet another subject matter of the present invention is such a nose ring allowing easier cleaning of the muzzle of the animal with its tongue.

Yet another subject matter of the present invention is such a nose ring for the release of at least one substance such as a veterinary product, or a non-therapeutic substance, in the nostrils of the ruminant.

DISCLOSURE OF THE INVENTION

To this end, the invention relates to a nose ring for ruminants, such as cattle, sheep, or goats, comprising a ring body having an extra-nasal part and intra-nasal parts extending on either side of this extra-nasal part, each of these intra-nasal parts bearing a plate intended to bear against the nasal septum separating the nasal cavities from a ruminant, said bearing plates thus being placed at the ends of said nose ring.

According to the invention, each bearing plate has an elongate shape and comprises opposite ends, at least one of which is wider than the central region placed between said two ends, each plate being convex and having a front face intended to come into contact with the nasal wall of the animal, the surface area of which is at least equal to 500 mm$^2$, preferentially at least equal to 750 mm$^2$, even more preferentially at least equal to 1500 mm$^2$, and most preferentially at least equal to 2000 mm$^2$, each bearing plate thus being capable of maximizing the contact surface with the nasal septum for different nasal morphologies in order to ensure that this ring is retained without injuring the animal.

Advantageously, the original design of this nose ring ensures a firm holding thereof on the nasal septum of the ruminant while locally constraining the nasal septum as little as possible.

This aim is achieved with a contact surface of each plate with the nasal septum which is maximized, the front face of each plate matching the shape of the nasal septum, which makes it possible to reduce the stresses by distributing the force exerted by the pinching across a larger surface.

The convex shape of the plate ensures a maximum contact surface with the nasal wall.

Furthermore, and advantageously, the edges of the plate are rounded, having no sharp angles likely to injure the animal.

Tests have advantageously shown a substantially reduced risk of damage to the nasal mucosa when the ruminant is wearing this nose ring.

Advantageously, the ring body is made of a resiliently deformable material.

Purely by way of illustration, this ring body is made of an injectable polymer such as a polypropylene (PP), a polyethylene (PE) or a polyamide (PA).

According to one embodiment of the present invention, these plates are advantageously removable.

As these plates are functionalized, they can thus easily be changed by the operator to present various functions.

By way of example, these plates can be configured to release substances such as hormones, in the animal's nostrils, or be configured to remotely monitor the animal's parameters such as its temperature, its heart rate, etc.

In the latter case, each plate comprises a recess making it possible to integrate at least one such sensor, which is or is not flush with the front face of that plate.

The nose ring may advantageously comprise a central unit connected to an antenna to collect and communicate these data according to a wireless communication protocol.

Alternatively, the operator can also implement non-functionalized plates used only to retain the nose ring.

According to another embodiment of this nose ring for ruminants, each plate is fixed in position in a clipped or screwable manner on the free end of the corresponding intra-nasal part.

By way of example, each free end of the ring body defines a bent arm shaped to extend parallel or substantially parallel to the nasal septum against which the corresponding plate is intended to bear.

Each plate then comprises one or more fasteners to ensure its fastening to its corresponding arm.

Advantageously, during the potential loss of a bearing plate, it is ensured that the free end of the corresponding ring body remains parallel or substantially parallel to the nasal septum so as not to injure it.

According to another embodiment of this nose ring for ruminants, the plates of said nose ring are spaced apart from each other by a distance d, this nose ring being unstressed, or in its rest configuration, i.e. not separated.

This distance d is advantageously between one (1) and ten (10) mm. Thus, it is ensured that the animal is not injured.

According to yet another embodiment of this nose ring for ruminants, the central portion of the front face corresponding to said central zone contains the top of said plate while the central portion of the rear face corresponding to said central zone is directly connected to the corresponding intra-nasal part.

Advantageously, being convex or even curved, the top of this plate is placed in the central region of its front face while the connection of this plate with the end of the corresponding intra-nasal part is made in the central region of its rear face.

According to yet another embodiment of this nose ring for ruminants, each plate generally has a kidney bean shape to present an indentation intended to receive, or engage, a protrusion of the nasal floor of the corresponding nostril so as to ensure the positioning of its front face with respect to said nasal septum.

The plate is thus wedged in the bearing position on the nasal floor so as to have its front face at a predetermined caster angle to best fit the nasal wall.

Furthermore, the bearing of this plate on the nasal floor makes it possible to exert less stress on the nasal wall and therefore to limit the sensation of discomfort for the ruminant.

According to yet another embodiment of this nose ring for ruminants, said bearing plates are different in order to take into account the symmetrical morphologies of the two nostrils of a ruminant's snout.

These two nostrils in fact have mirror symmetry relative to a plane of symmetry passing through the nasal septum. These bearing plates are therefore symmetrical relative to a median plane of the nose ring, or relative to the nasal septum, when this ring is worn by the animal.

According to yet another embodiment of this nose ring for ruminants, each plate has a top angle, also called a caster, of 140+/−5°.

According to yet another embodiment of this nose ring for ruminants, the ring body comprises a median covering portion and curved lateral branches, said median portion and said lateral branches defining a flattened U-shaped profile, said median portion being intended to cover the animal's snout. Advantageously, the ring body is thus offset on the upper portion of the animal's snout to keep the muzzle as clear as possible. Released from this ring, the animal is once again able to clean this area with its tongue for better hygiene.

In addition, the ruminant is able to actuate objects with its muzzle without feeling stress so that it can feed and drink more easily.

Preferably, the extra-nasal part is symmetrical relative to a plane passing through the nasal septum.

Advantageously, the median portion has a U shape whose base, or a V shape whose point, is directed opposite the muzzle of the animal when the nose ring is worn by the ruminant, to keep the muzzle of the animal as clear as possible.

Advantageously, the lower end of the nose ring being determined by an end of one or more bearing plates and the upper end of said nose ring being determined by points of the lateral branches of the ring body intended to be placed outside the nostrils, the distance separating the lower and upper ends of the nose ring is less than or equal to 70 mm and even better still at 65 mm so that the median portion is close to or is placed near the exterior surface of the snout when the nose ring is worn by a ruminant.

The nose ring of the invention thus has a lower likelihood of tearing because it is generally closer to the animal's snout.

According to yet another embodiment of this nose ring for ruminants, the distance separating the end of the intra-nasal part intended to be placed in line with, or substantially in line with, the inlet of the corresponding nostril, from the center of the plate borne by this intra-nasal part is equal to 45+/−10 mm.

According to yet another embodiment of this nose ring for ruminants, at least one of said bearing plates is configured to allow the prolonged release of at least one substance over a period of time.

This substance may be a veterinary product (antiparasitic, anti-infective, etc.), hormones, or a non-therapeutic substance such as vitamins or pheromones.

Preferably, at least the front face of said or each bearing plate is covered, or said or each plate is impregnated, with said at least one substance to be administered.

Advantageously, said or each support plate is configured so that the distribution rate of said at least one substance is based on the extent of its contact surface with the nasal septum.

This substance may be a composition comprising:
between 35 and 55% by weight of a polymeric matrix comprising a thermoplastic polymer having a Shore A hardness of between 20 and 100 as measured by a type A durometer according to the ASTM D2240 standard and a melting point of between 40 and 200 C; and between 30% and 55% by weight of progesterone, relative to the total weight of the composition.

This substance may be a composition comprising:

a polymeric matrix comprising a thermoplastic polymer having a Shore A hardness of between 20 and 100 as measured by a type A durometer according to the ASTM D2240 standard and a melting point of between 40 and 200° C.; and progesterone, wherein the ratio by weight of progesterone to the polymeric matrix is between 0.5 and 2, preferably between 0.54 and 1.57, and even more preferably 1 or 1.28.

In another variant, this substance may be a composition comprising:

a polymeric matrix comprising a thermoplastic polymer having a Shore A hardness of between 20 and 100 as measured by a type A durometer according to the ASTM D2240 standard and a melting point of between 40 and 200° C.; and progesterone, wherein the area density of progesterone in the polymeric matrix is between 20 and 100 mg/cm$^2$, preferably between 25 and 80 mg/cm$^2$.

Advantageously, it is observed that these polymeric compositions concentrated with progesterone release hormones continuously and in a prolonged manner over time.

Preferably, said thermoplastic polymer is a thermoplastic polymer of the EVA type or a thermoplastic elastomer (TPE) polymer.

According to yet another embodiment of this nose ring for ruminants, it comprises one or more elements selected from the group comprising an accelerometer, a gyroscope, a temperature sensor, a heart rate sensor, a humidity sensor, a radar, a device for locating this ring close to a waterer or feeder, and combinations of these elements.

These sensors advantageously make it possible to remotely collect information about the ruminant: position, activity, feeding, watering, state of health.

Some of these sensors such as the accelerometer, the gyroscope or even the localization device can be integrated into, or placed on, the ring body, for example in its extra-nasal part.

Other such as the heart rate sensor or the temperature sensor, are intended to be housed in, or placed on, the bearing plates.

The present invention also relates to a computer-assisted design method of a nose ring for ruminants, the method comprising at least steps of:

obtaining a plurality of images of at least part of the snout of a plurality of ruminants, said part comprising the nostrils;

for each ruminant, creating a three-dimensional virtual model of at least a portion of the snout from the images previously obtained for this ruminant, said virtual model incorporating the nostrils;

for each ruminant and for each of the nostrils of the ruminant in question:

positioning a volume of virtual bearing plate in the corresponding nostril of the virtual model, and relative to at least one reference anatomical marker of said corresponding nostril, so as to define at least two zones of intersection between the volume of said virtual bearing plate and the nostril, said at least two zones of intersection defining cutting planes necessary to position the bearing plate in the nostril against the nasal septum and bearing on the nasal floor;

detecting the contours of said zones of intersection;

maximizing the contact surface of the plate with the nasal septum;

defining the plate corresponding to the nostril and to said ruminant, this plate having the previously detected contours, then determining from different bearing plates thus obtained and for each nostril, a bearing plate whose shape, dimensions and angle of presentation of the plate in the nostril maximize the contact surface of the bearing plate with the nasal septum for different morphologies of the nostril without harming the animal.

Such a design method can be implemented to determine so-called universal plates of a nose ring for a particular breed, or for different breeds of the same animal such as a bovine, sheep or other.

Alternatively, it could be implemented to produce plates to be measured for a specific animal by taking at least two images of at least part of the snout of this animal, this part of the snout incorporating the nostrils, and then creating a three-dimensional virtual model of at least a portion of the snout of this animal from the images previously obtained, said virtual model incorporating the nostrils.

BRIEF DESCRIPTION OF THE DRAWINGS

Other advantages, aims and particular features of the present invention will become apparent from the following description, made, for explanatory purposes and in no way limiting, with reference to the appended drawings, in which.

DESCRIPTION OF EMBODIMENTS

The drawings and the following description essentially contain elements of a certain nature. They may therefore not only serve to better understand the present invention, but also contribute to its definition, where appropriate.

First, it should be noted that the figures are not to scale.

FIGS. 1 to 6 schematically illustrate a nose ring for a bovine according to a first embodiment of the present invention.

This nose ring comprises a ring body 1 made of a flexible, resiliently deformable material such as a polymer, which makes it possible to vary the distance between the terminal ends of the ring.

This ring body 1 comprises an extra-nasal part 2 intended to be placed outside the bovine's snout and the intra-nasal parts 3 extending on either side of this extra-nasal part 2 and in the extension thereof.

Plates 4, 5 intended to bear against the nasal septum separating the bovine's nostrils are carried by the intranasal parts 3.

These two bearing plates 4, 5 thus form the terminal ends of the nose ring.

When these plates 4, 5 are positioned in the nostrils of the animal, they exert a slight pressure on the nasal septum thereof to ensure the holding in position of the nose ring.

Each bearing plate 4, 5 has an elongate shape and comprises opposite ends, at least one of which is wider than the central region placed between said two ends, Here, the widest end is intended to be placed furthest inside the nasal cavity.

Each plate 4, 5 is slightly convex, or even curved, the top of this plate being placed in the central part of its front face intended to come into contact with the nasal septum of the bovine. The rear face of each plate 4, 5 is connected to the end of the corresponding intra-nasal part.

The surface of the front face of each plate 4, 5 is here advantageously at least 2000 mm$^2$ for a bovine, here 3000 mm$^2$, to ensure a distribution of the pressure over a larger surface area of the nasal septum.

Each plate 4, 5 generally has a kidney bean shape and has an indentation 9 intended to receive, or engage, a natural protrusion 6 of the nasal floor from the corresponding nostril.

These plates 4, 5 are thus supported both against the nasal floor and against the nasal septum of their corresponding nostril, so that the pressure to be applied to this nasal septum to ensure the retention in position of the nose ring is less than with the rings of the prior art.

Furthermore, this bearing of each plate 4, 5 on two anatomical intersection areas formed by the nasal floor and the nasal septum, ensures a stable positioning of each bearing plate.

Figure 6:
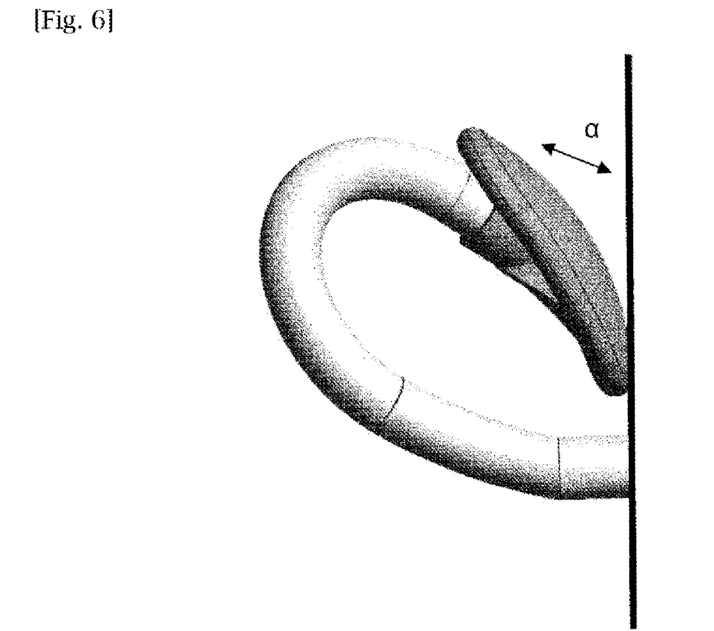
FIG. 6 shows the caster angle formed by a plate of the nose ring of FIG. 1.

As shown in FIG. 6, each plate 4, 5 having an angle α, viewable in a top view, also called a caster angle, determined to be 140°, the front face of each plate fits the nasal wall. A mobility of each plate of about 45° around the end of the support allows good adjustment of the caster to the nasal mucosa.

In more detail, the ring body 1 comprises a median covering portion 7 and curved lateral branches 8, this median portion 7 and these lateral branches 8 defining a flattened U-shaped profile.

This median portion 7 which is intended to cover the animal's snout, also has a U shape whose base is directed opposite the muzzle of the animal when this nose ring is worn by the bovine.

Figure 1:
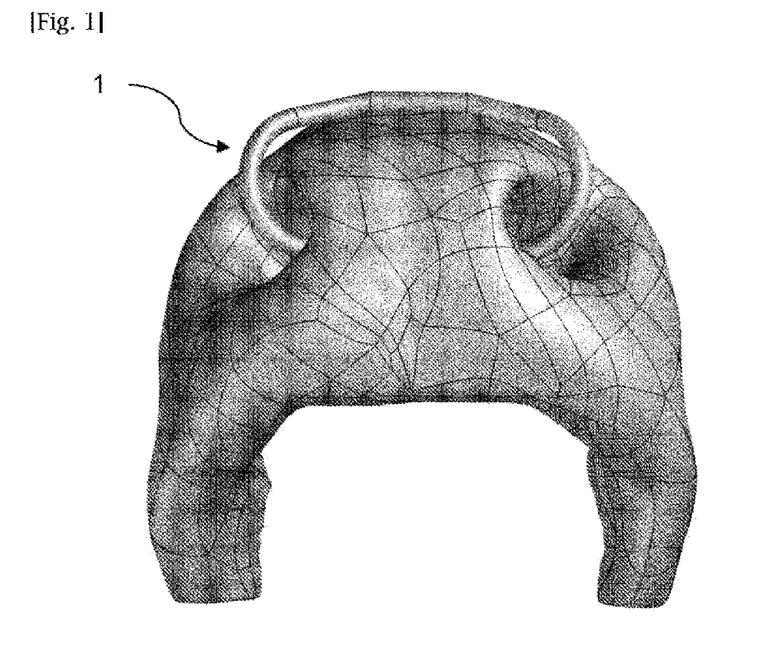
FIG. 1 is a partial and front representation of the end of the snout of a bovine wearing a nose ring according to a first embodiment of the present invention.
Figure 2:
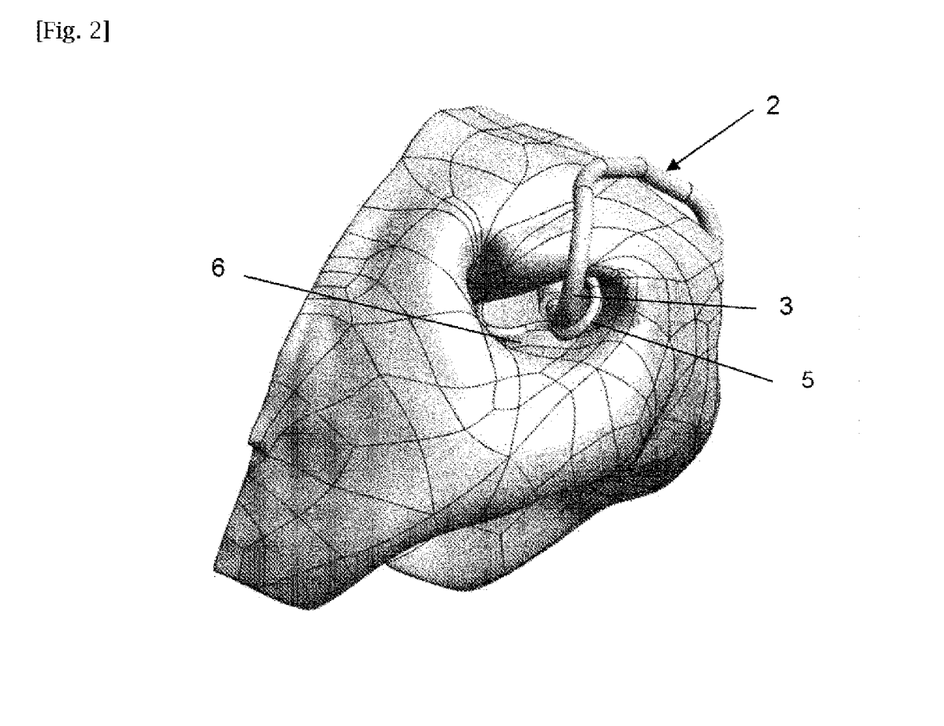
FIG. 2 is a partial and perspective representation of the end of the bovine snout shown in FIG. 1.
Figure 3:
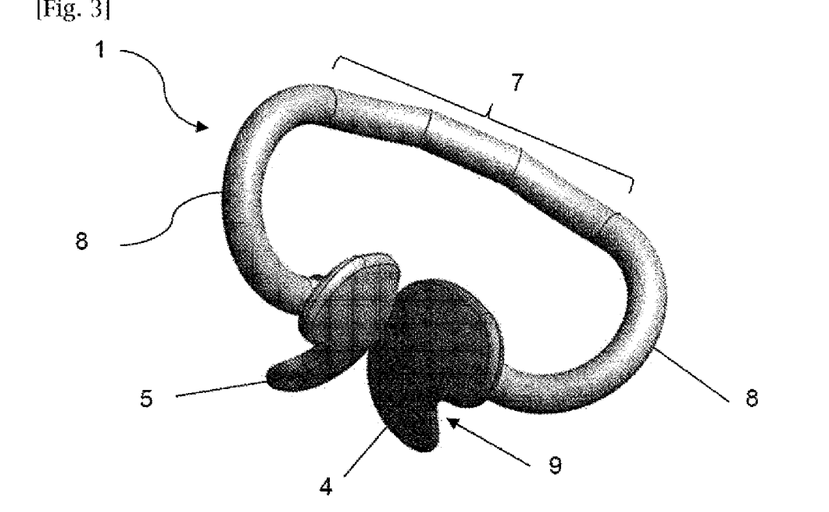
FIG. 3 is a first perspective view of the nose ring of FIG. 1.
Figure 4:
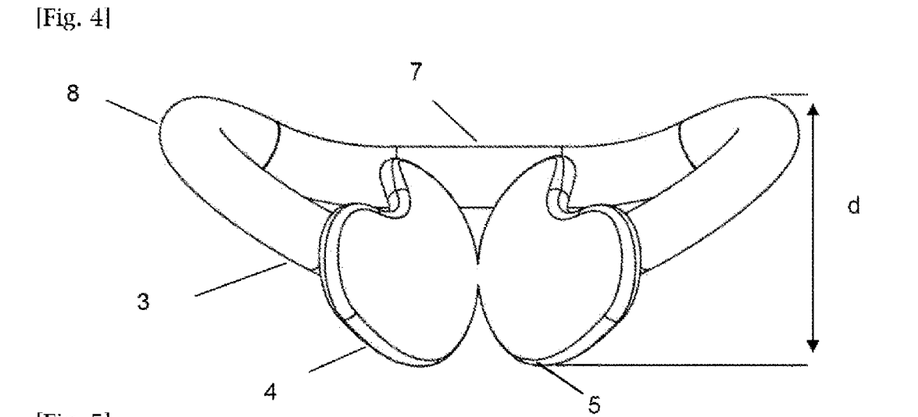
FIG. 4 is a second view of the nose ring of FIG. 1.
Figure 5:
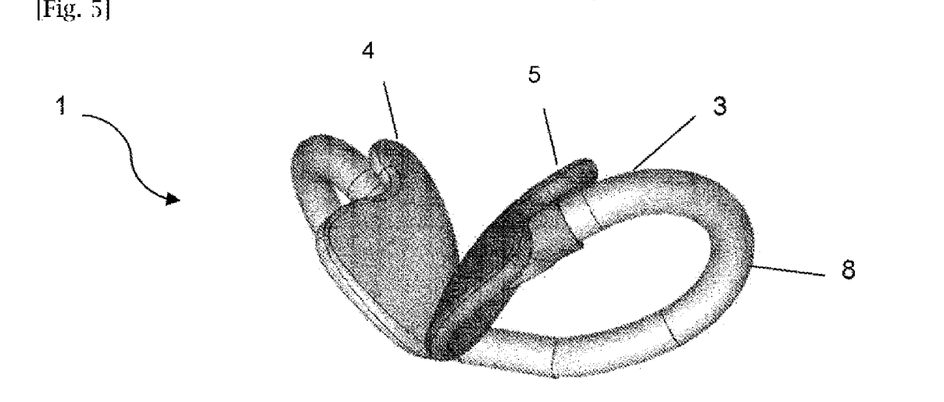
FIG. 5 is a second view of the nose ring of FIG. 1.

As shown in FIGS. 1 and 2, the body of the nose ring passes over the top of the bovine's snout and leaves the animal's muzzle free.

Advantageously, the distance d separating the lower and upper ends of the nose ring is here equal to 65 mm so that the median portion 7 is placed as close as possible to the exterior surface of the snout when the nose ring is worn by the bovine.

The risk of snagging the nose ring is thus greatly reduced.

In addition, the distance separating the end of the intra-nasal part 3 intended to be placed in line with, or substantially in line with, the inlet of the corresponding nostril, from the center of the plate 4, 5 borne by this intra-nasal part is equal here to 45 mm.

The ring body here has a straight section having a circular shape and a diameter of eight (8) mm. Alternatively, it could have a section of diameter equal to six (6) or ten (10) mm.

Advantageously, it is noted that the present nose ring maximizes the wellness of cattle while significantly reducing the risks of appearance of injuries.

Figure 7:
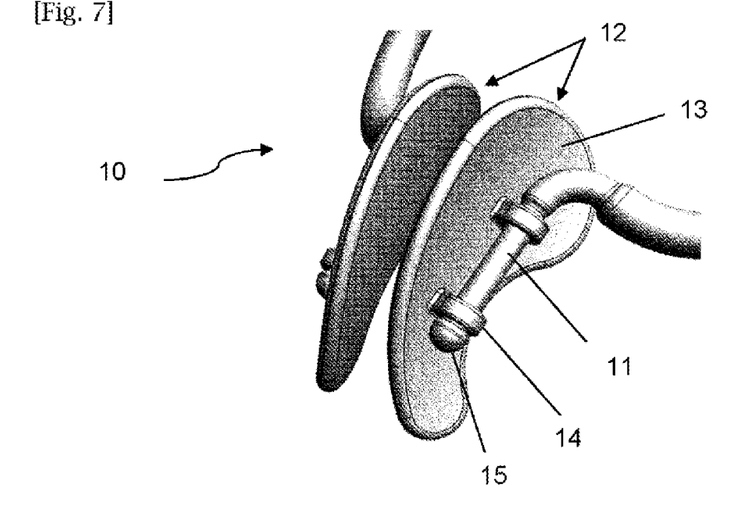
FIG. 7 is a partial view of a nose ring according to a second embodiment of the present invention, showing the system for attaching the plates with the ends of the intra-nasal parts of the nose ring.
Figure 8:
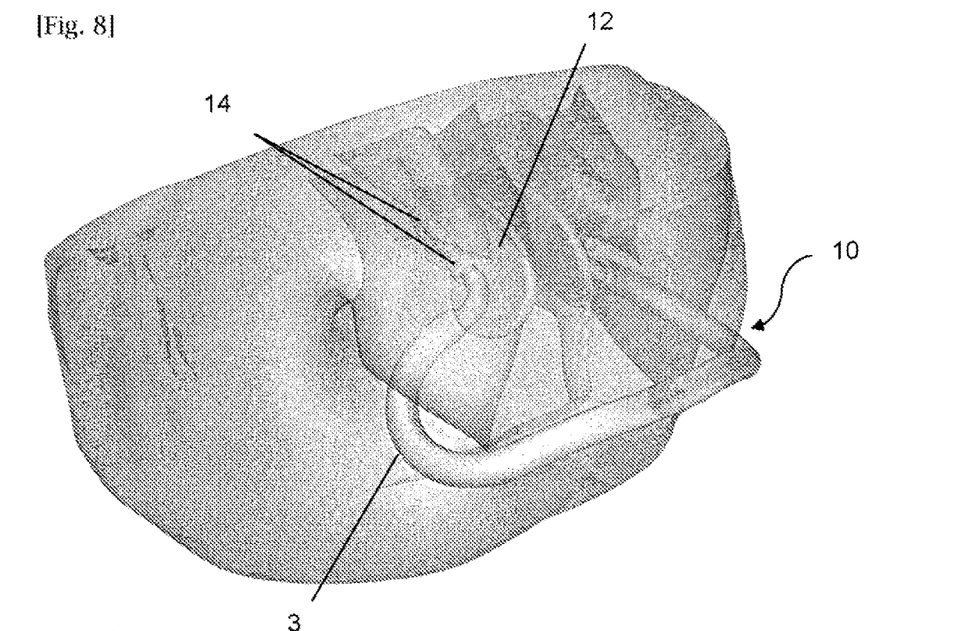
FIG. 8 is a partial and perspective representation of the end of the bovine snout wearing a nose ring as shown in FIG. 7.
Figure 9:
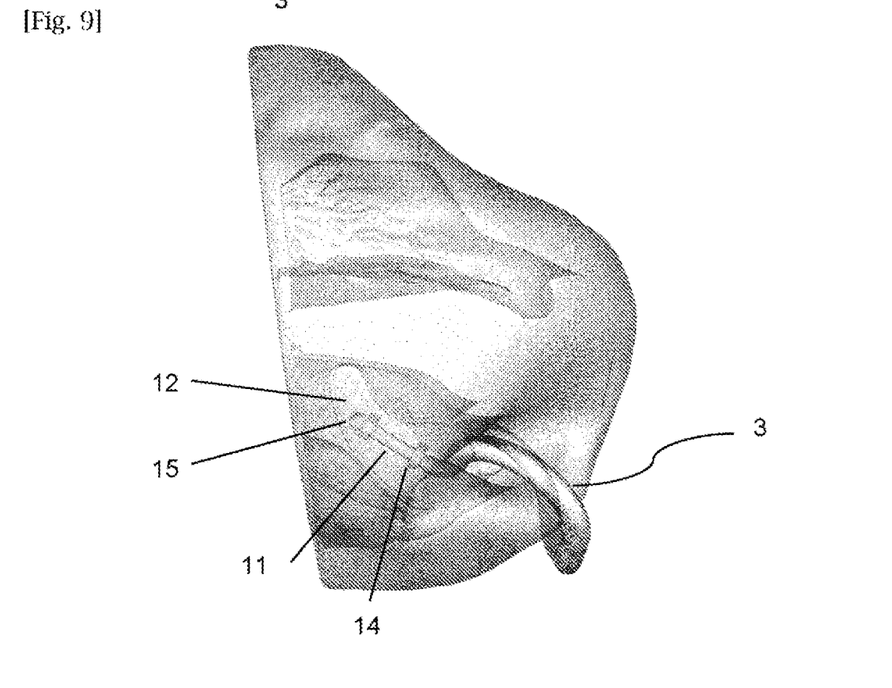
FIG. 9 is another view of the end of the bovine snout wearing a nose ring as shown in FIG. 7.

FIGS. 7 to 9 schematically illustrate a nose ring for a bovine according to a first embodiment of the present invention.

This nose ring 10 is identical to the nose ring 1 described above with the exception of the intra-nasal parts 3.

These each comprise a bent arm 11 shaped to extend parallel or substantially parallel to the nasal septum against which the bearing plate 12 borne by the corresponding intra-nasal part is intended to bear, when the nose ring is in position.

During a possible loss of a bearing plate 12, the free end of the corresponding intra-nasal part is thus prevented from injuring the nasal septum.

Each bearing plate 12 comprises on its outer surface 13, intended to be placed opposite the nasal septum of the ruminant, a system for fastening this bearing plate 12 with the bent arm 11 of the corresponding intra-nasal part.

This fastening system here comprises two loops 14 through which the bent arm 11 extends when the bearing plate 12 is in the assembled position with the free end of the corresponding intra-nasal part 3. The free end of the bent arm 11 here comprises a protuberance 15 to ensure the clipping of the bent arm 11 into the loops 14 of the bearing plate 12.

The invention claimed is:

1. A nasal loop for ruminants, comprising a loop body (1) comprising an extra-nasal part (2) and intra-nasal parts (3) extending on either side of this extra-nasal part (2), each of these intra-nasal parts (3) carrying a plate (4, 5) intended to bear against the nasal partition separating the nasal cavities from a ruminant, said bearing plates (4, 5) thus being placed at the ends of said nasal loop, characterized in that:

each bearing plate (4, 5) has an elongated shape and comprises opposite ends, at least one of which is wider than its central region placed between said two ends,
   each plate being convex and having a front face intended to come into contact with the nasal wall of the animal the surface of which is at least equal to 500 mm$^2$, each bearing plate thus being able to maximize the contact surface with the nasal partition for different morphologies of the nose to ensure the holding of this loop without injuring the ruminant.

2. The nasal loop according to claim 1, characterized in that each plate (4, 5) has a kidney bean shape to present an indentation (9) for receiving a protrusion (6) of the nose floor of the corresponding nose so as to ensure the positioning of its front face facing said nasal partition; wherein pressure is configured to be applied to the nasal septum by the front face of each plate and pressure is configured to be applied to the nasal floor by the indentation of each plate.

3. The nasal loop according to claim 1, characterized in that said support plates (4, 5) are different in shape in order to take into account the symmetrical morphologies of the two nostrils of the snout of a ruminant.

4. The nasal loop according to claim 1, characterized in that each plate (4, 5) has a top angle, also called a flush angle, of 140°+/−5°.

5. The nasal loop according to claim 1, characterized in that the loop body (1) comprises a median covering portion (7) and curved lateral branches (8), said median portion and said lateral branches defining a flattened U-shaped profile, said median portion being intended to cover the animal's musk.

6. The nasal loop according to claim 1, characterized in that the lower end of the nasal loop being determined by an end of one or more support plates (4, 5) and the upper end of said nasal loop being determined by points of the lateral branches of the loop body (1) intended to be placed outside the nasal lines, the distance separating the lower and upper ends of the nasal loop is less than or equal to 70 mm so that the median portion is close to the exterior surface of the nose when the nasal loop is worn by a ruminant.

7. The nasal loop according to claim 6, characterized in that the median portion (7) has a U shape whose base is directed opposite the muffle of the animal when the nasal loop is worn by the ruminant, to clear the muffle of the animal.

8. The nasal loop according to claim 1, characterized in that each free end of the loop body (1) defines a bent arm shaped to extend parallel or substantially parallel to the nasal partition against which the corresponding plate (4, 5) is intended to bear and in that each plate (4, 5) comprises one or several fasteners to ensure its fastening to its corresponding arm.

9. The nasal loop according to claim 1, characterized in that at least one of said support plates (4, 5) is configured to allow the sustained release of at least one substance over a period of time.

10. The nasal loop according to claim 9, characterized in that at least the front face of said each support plate is covered, or in that said er each plate is impregnated, of said at least one substance to be administered.

11. The nasal loop according to claim 10, characterized in that said or each bearing plate is configured so that the distribution rate of said at least one substance is based on the extent of its contact surface with the nasal partition.

12. The nasal loop according to claim 10, characterized in that said substance is a composition comprising:

between 35 and 55% by weight of a polymeric matrix comprising a thermoplastic polymer having a Shore A hardness comprised between 20 and 100 as measured by a type A durometer according to the ASTM D2240 standard and a melting point of between 40 and 200 C; and between 30% and 55% by weight of progesterone, relative to the total weight of the composition.

13. The nasal loop according to claim 10, characterized in that said substance is a composition comprising:

a polymeric matrix comprising a thermoplastic polymer having a Shore A hardness comprised between 20 and 100 as measured by a type A durometer according to ASTM D2240 and a melting point between 4° and 200° C.; and progesterone, wherein the ratio by weight of progesterone to the polymeric matrix is between 0.5 and 2.

14. The nasal loop according to claim 10, characterized in that said substance is a composition comprising:

a polymeric matrix comprising a thermoplastic polymer having a Shore A hardness comprised between 20 and 100 as measured by a type A durometer according to ASTM D2240 and a melting point between 4° and 200° C.; and progesterone in which the basis weight of progesterone in the polymeric matrix is between 20 and 100 $mg/cm^2$.

15. The nasal loop according to claim 1, characterized in that said nasal loop comprises one or more elements selected from the group comprising an accelerometer, a gyroscope, a temperature sensor, a heart rate sensor, a humidity sensor, a radar or a device for locating this loop close to waterer.

16. The nasal loop according to claim 1, characterized in that the surface of the front face of the plate is at least equal to 1500 $mm^2$.

17. The nasal loop according to claim 1, characterized in that the surface of the front face of the plate is at least equal to 2000 $mm^2$.

* * * * *